United States Patent Office 3,122,411
Patented Feb. 25, 1964

3,122,411
TREATMENT OF CELLULOSIC FABRICS AND THE PRODUCTS THEREBY OBTAINED
John L. Gardon, Levittown, and Leo S. Luskin, Philadelphia, Pa., assignors to Rohm & Haas Company, Philadelphia, Pa., a corporation of Delaware
No Drawing. Filed Oct. 6, 1960, Ser. No. 60,798
16 Claims. (Cl. 8—116)

This invention relates to the treatment of cellulosic fabrics, such as those of cotton and regenerated cellulose rayon, for the purpose of imparting to them increased resilience, improved recovery from creasing, wrinkling, and other deformations, and the characteristic of having reduced shrinkage on washing so that partial or complete dimensional stabilization may be effected. The invention also embraces the treated fabrics obtained.

In accordance with the present invention, it has been found that cellulosic fabrics, woven, knitted, or otherwise formed, have reduced shrinkage on washing and acquire resistance to creasing and crushing when they are treated with an aromatic polyol of the formula

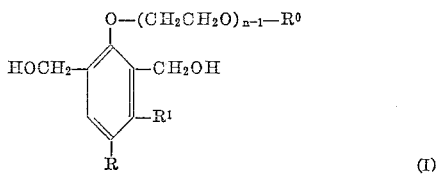

(I)

wherein $n$ is an integer having a value of 1 to 4,
R is selected from the group consisting of —H, —CH$_3$, —OCH$_3$, and —CH$_2$OH,
R$^1$ is selected from the group consisting of —H and —CH$_3$,
R$^0$ is an alkyl group having 1 to 4 carbon atoms.

The preferred compounds are those in which $n$ is 1, R$^0$ is —CH$_3$, R is —CH$_2$OH, and R$^1$ is —H or —CH$_3$, or in which $n$ is 3 to 4, R$^0$ is —CH$_3$, and R and R$^1$ are both —H. The extent of modification by means of this compound may be controlled by variation in the proportion of the aromatic polyol and by variation in the amount of catalyst employed during the treatment therewith.

The compounds of Formula I wherein $n$ is 1 are known compounds. They may be prepared generally by condensation of monohydric or dihydric phenols with formaldehyde in the presence of alkaline hydroxide catalysts followed by etherification of the phenolic hydroxyl group with methyl halides or dimethyl sulfate in the presence of sodium hydroxide or sodium carbonate. This is the general method of Ullmann and Brittner, Ber. 42, 2539 (1909).

The compounds in which $n$ is greater than 1 are produced in the same way except the etherification is effected using alkoxyethyl iodides of the formula $$R^0(OCH_2CH_2)_{n-1}I$$

The treatment with the aromatic polyol may be effected most advantageously by means of aqueous solutions thereof in which the aromatic polyol is dissolved at a concentration which may vary from 2 to 25% by weight. Preferably, the concentration is from 5 to 15% to obtain the maximum benefits in crease-proofing and the like.

The treatment with the aromatic polyol is carried out in the presence of an acidic catalyst. Suitable catalysts are acids or acidic salts, such as oxalic acid, potassium persulfate, potassium bisulfate, magnesium chloride, ammonium chloride, zinc nitrate, zinc fluoborate, zinc perchlorate, and amine salts, such as the hydrochloride or sulfate or triethylamine, pyridine, morpholine, and 2-methyl-2-aminopropanol-1. Zinc perchlorate is a preferred catalyst with relatively little tendency to cause discoloration requiring bleaching.

Conveniently, the amount of catalyst may vary from about 0.1 to 3% and is preferably in the range of 0.5 to 2% concentration in the aqueous solution of the aromatic polyol.

The catalyzed solution of the aromatic polyol is compatible with solutions or dispersions of most of the common textile finishing agents, such as synthetic polymer latices and aminoplast resins or precondensates, so that they may be applied with the aromatic polyol to produce changes in the hand or other properties of the fabric.

The aqueous solution containing the aromatic polyol and catalyst may be applied to the fabric in any suitable manner such as by spraying or impregnation. In general, it is preferable to use some method of impregnation. With piece goods, this is conveniently carried out with the various machines used for treating fabrics in open width, such as pads or jigs. However, it is not required that the impregnation be carried out in open width, and the fabric may be handled in any form. In treating garments or other articles made from cellulosic fabrics, the impregnation may be carried out in a tumble wheel, laundry machine, or other suitable equipment. After application of the solution, it is desirable to remove the excess solution by squeezing the fabric between rollers, or by shaking or centrifuging it, in order to insure a more even treatment. The fabric treated with solution may be dried, such as by air-drying at normal room temperature or by heating in a drying oven at temperatures of 60° C. and up. The drying and curing operations are preferably done with the fabric open and flat, so that it will have a smooth and even appearance when finished. In a preferred embodiment, the impregnated fabric, immediately after impregnation and without preliminary low-temperature drying is carried in open width by a tenter frame through a curing oven where it is subjected to temperatures of about 110° C. to about 200° C. or higher for a period of time ranging from about one-half minute to about one-half hour or more, the shorter period being employed at the higher temperature and vice versa. Entirely satisfactory results are obtained by heating for 3 to 5 minutes at about 150° C. This curing operation not only dries the impregnated fabric but apparently causes a reaction between the aromatic polyol and the hydroxyl groups of the cellulose. The precise reaction is not known. It is theorized that the hydroxyl groups of the aromatic polyol may etherify hydroxyl groups of the same or different molecules of cellulose. It is not intended, however, that the present invention be limited to this theory of operation.

According to British Patents 291,473, 291,474, and 452,891, it has already been suggested to apply phenol-formaldehyde precondensates with alkaline catalysts to cellulosic fabrics to provide creaseproofing and shrink-resistant effects, but these materials have always caused severe discoloration and provide relatively small improvement in crease-resistance. The application of 2,6-bis(hydroxymethyl)-p-cresol with an acid catalyst is ineffective to improve the dry crease-recovery of cellulosic fabrics, although it did form a surface resin on the fabric. The application of α,α'-dihydroxyxylenes, whether o, m, or p, with an acid catalyst is also ineffective to improve the crease-recovery of cellulosic fabrics. The 1-hydroxyethyl ether of 2,6-(dihydroxymethyl)-4-methylphenol having the formula

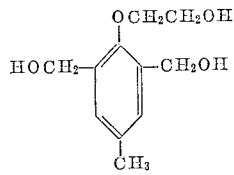

is also ineffective. It is therefore surprising that the compounds of the present invention are capable of efficiently creaseproofing cellulosic fabrics, and especially with little or no discoloration.

The treated fabrics of the present invention exhibit a high degree of crush resistance and crease recovery with little or no change in the hand or feel of the fabric. The treatment does not discolor the fabric. In addition, the treated fabrics have the important advantage that they do not retain chlorine, so that the use of bleaching agents containing chlorine does not cause deterioration either by way of discoloration or loss in tensile strength even when the treated fabrics which have been bleached are subjected to ironing temperatures. The treated fabrics are also resistant to shrinkage during laundering, and the treatment is very permanent towards laundering, dry-cleaning, and other procedures for cleaning textile fabrics. The treatment of the present invention using an aromatic polyol as the sole cross-linking or crease-proofing agent provides a finish that is more stable to hydrolysis in acids and alkalies than the usual nitrogenous or aminoplast finishes. Any color introduced by the treatment is readily removable by conventional bleaching agents, such as sodium hypochlorite.

The following examples illustrate the present invention, and the parts and percentages therein are by weight unless otherwise noted. The crease recovery values given below were determined by the Shirley Institute procedure (British Standards Handbook No. 11, 1949 ed., page 128) in the warp direction.

EXAMPLE A

*Preparation of 2-(Methoxyethoxyethoxy)-5-Methyl-α,α'-Dihydroxy-m-Xylene*

Twenty-nine grams (0.17 mole) of 2-hydroxy-5-methyl-α,α'-dihydroxy-m-xylene (Ullmann et al., Ber. 42, 2539 (1909)) was added to a solution of 10.5 g. of sodium methylate in 150 ml. of methanol. After becoming almost clear, the sodium phenate deposited as a thick slurry. 1-methoxy-2-iodoethoxy-ethane (43.7 g., 0.19 mole) was added to this slurry which was heated under reflux. Heating was continued for 18 hours. The clear, yellow solution was evaporated to give 75 g. of residue. An aliquot (25 g.) was dissolved in 50 ml. of water and extracted twice at 70° C. with 25 ml. portions of t-amyl alcohol. The extract was evaporated to a viscous, amber oil. It was redissolved in 50 ml. of water, filtered, and diluted with 830 g. of water. The solution was passed through 50 ml. of a mixture of cation-exchange and anion-exchange resins. The colorless, slightly turbid filtrate was neutral and free of iodide. Evaporation gave 12 g. of an amber oil, whose solubility in water was between 2 and 5% at 45° C.

*Analysis.*—Calcd. for $C_{14}H_{22}O_5$: C, 62.20%; H, 8.21%. Found: C, 62.21%; H, 8.13%.

EXAMPLE B

*Preparation of 2,5-Dimethoxy-α,α'-Dihydroxy-m-xylene*

Thirty-seven grams (0.2 mole) of 2-hydroxy-5-methoxy-α,α'-dihydroxy-m-xylene (Moran et al., J.A.C.S. 74, 127 (1952)) was added to 16.6 g. (0.415 mole) of sodium hydroxide dissolved in 200 ml. of water. Dimethyl sulfate (27.7 g., 0.22 mole) was added at 50° C. After standing overnight, the amber viscous solution was saturated with salt (72 g.) and warmed at 70° C. Chilling gave 15 g. of crude product. The filtrate was heated at 50° with 10 g. of dimethyl sulfate for 2 hours. Chilling gave 32 g. of solids. The products were recrystallized from toluene to give 8.5 g. of product, M.P. 107–108° C. solubility below 2% at 25° C. but over 20% at 45° C.

*Analysis.*—Calcd. for $C_{10}H_{14}O_4$: C, 60.59%; H, 7.12%. Found: C, 60.44%; H, 7.12%.

EXAMPLE C

*Preparation of 2,4,6-Tri(Hydroxymethyl)-3-Methyl-Anisole*

A slurry containing 20 grams (0.091 mole) of the sodium salt of 2-hydroxy-4-methyl-α,α',α''-mesitylenetriol (Martin, J.A.C.S. 73, 3952 (1951) and Freeman, J.A.C.S. 74, 6257 (1952)) and methyl iodide (19.3 g., 0.135 mole) in methanol (90 ml.) was heated in a pressure bottle at 50° C. for 18 hours to give a clear, yellow solution. Evaporation gave 31.5 g. of a viscous gum which was dissolved in 35 ml. of t-amyl alcohol and filtered to remove a little solid. The solid was washed with 15 ml. of t-amyl alcohol. The combined filtrates were extracted twice at 80–85° C. with 10 ml. portions of water. The alcohol was evaporated and the residue was dissolved (turbid mixture) in 2376 ml. of deionized water. The mixture decanted from resinous material, was passed through a bed of 100 ml. of a mixture of cation-exchange and anion-exchange resins to give a colorless, slightly turbid effluent. Evaporation gave 6 g. (31%) of a yellow gum which was made into a 25% solution in 50% aqueous acetone.

*Analysis.*—Calcd. for $C_{11}H_{16}O_4$: C, 62.24%; H, 7.60%. Found: C, 63.50%; H, 7.47%.

EXAMPLE D

*Preparation of 2-(Methoxyethoxyethoxy)-5-Hydroxymethyl-α,α'-Dihydroxy-m-Xylene*

A slurry containing 17.5 grams (0.085 mole) of the sodium salt of 2-hydroxy-α,α',α''-mesitylenetriol (Freeman, J.A.C.S. 74, 6257 (1952)) and 1-methoxy-2-β-iodoethoxyethane (20 g., 0.085 mole) in 75 ml. of methanol was heated overnight under reflux to give an amber liquid containing a small amount of fine solids. After removal of the solid (about 1 g.), the solvent was evaporated to give 28 g. of an amber residue. This was dissolved in 75 ml. of t-amyl alcohol and extracted twice with 10 ml. portions of water at 80° C. The alcoholic solution was again evaporated to give 20.5 g. of a concentrate which still contained some free base and sodium iodide (about 3.4 g.). It was therefore dissolved in 1120 ml. of water and passed through a column containing 65 ml. of a mixture of cation-exchange and anion-exchange resins. The slightly turbid effluent was evaporated to dryness, giving 13 g. (53%) of an amber viscous concentrate which formed a turbid solution in water in a concentration of 1 percent.

*Analysis.*—Calcd. for $C_{14}H_{22}O_6$: C, 58.72; H, 7.75. Found: C, 59.51; H, 7.45.

EXAMPLE 1

A sample of cotton printcloth was saturated with an aqueous acetone solution (water to acetone 1:1 weight ratio) containing 13.5% of 2,6-di(hydroxymethyl)-4-methylphenyl methyl ether (Ullmann et al., Ber. 42, 2539 (1909)) and 0.9% zinc perchlorate. It was then put into an oven at 150° C. and baked for 12 minutes. A control treated with water was similarly prepared. After being conditioned, the samples had the following crease-recovery values:

| | Crease-recovery angle, degrees |
|---|---|
| Water control | 71 |
| Polyol-treated | 123 |

The aromatic polyol-treated fabric was insoluble in cuprammonium hydroxide while the control dissolved readily.

EXAMPLE 2

The procedure of Example 1 is repeated using rayon challis instead of cotton printcloth. The treated fabric was insoluble in cuprammonium hydroxide and had similar crease-recovery of 120°.

EXAMPLE 3

A sample of cotton printcloth was saturated with an aqueous acetone (1:1) solution containing 8.4% of 2,4,6-tri-(hydroxymethyl)-3-methyl-anisole (Example C) and 1% of zinc perchlorate. It was then put into an oven at 150° C. and baked 12 minutes. The treated product had a crease-recovery angle of 124°.

Similar results are obtained when 1.8% zinc fluoborate is used as the catalyst.

EXAMPLE 4

A sample of cotton printcloth was saturated with an aqueous acetone solution (water to acetone 1:1 weight ratio) containing 9% of 2,5-dimethoxy-α,α'-dihydroxy-m-xylene (Example B) and 1.5% zinc perchlorate. It was then put into an oven at 150° C. and baked for 12 minutes. The treated product showed improved crease recovery.

EXAMPLE 5

A sample of cotton printcloth was saturated with an aqueous acetone solution (water to acetone 1:1 weight ratio) containing 9% of 2-(methoxyethoxyethoxy)-5-methyl-α,α'-dihydroxy-m-xylene (Example A) and 1.5% zinc perchlorate. It was then put into an oven at 150° C. and baked for 12 minutes. The treated product showed improved crease recovery.

EXAMPLE 6

A sample of cotton printcloth was saturated with an aqueous solution containing 8.4% of 2,4,6-tri(hydroxymethyl)-anisole and 1.5% of zinc perchlorate. The impregnated fabric was then put into an oven at 150° C. for 12 minutes. It had a dry crease-recovery angle of 129°

EXAMPLE 7

A sample of cotton printcloth was saturated with an aqueous solution containing 19% of 2(methoxyethoxyethoxy) - 5 - hydroxymethyl - α,α' - dihydroxy - m - xylene and 1.5% of zinc perchlorate. The impregnated fabric was then put into an oven at 150° C. for 12 minutes. It had a dry crease-recovery angle of 121°.

We claim:

1. The process comprising impregnating a cellulose fabric with an aqueous solution containing at least 2% by weight of a compound of the formula

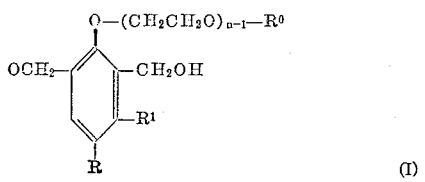

wherein $n$ is an integer having a value of 1 to 4,
R is selected from the group consisting of —H, —CH$_3$, —OCH$_3$, and —CH$_2$OH,
R$^1$ is selected from the group consisting of —H and —CH$_3$,
R$^0$ is an alkyl group having 1 to 4 carbon atoms, and at least 0.1% by weight of an acidic catalyst, and heating the impregnated fabric at a temperature of about 110° C. to 200° C., whereby the crease resistance of the fabric is increased.

2. The process comprising impregnating a cellulose fabric with an aqueous solution containing 2 to 25% by weight of a compound of the formula

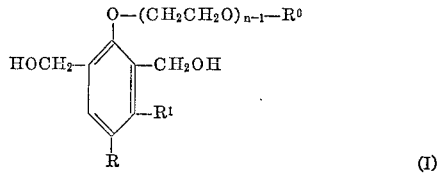

wherein $n$ is an integer having a value of 1 to 4,
R is selected from the group consisting of —H, —CH$_3$, —OCH$_3$, and —CH$_2$OH,
R$^1$ is selected from the group consisting of —H and —CH$_3$,
R$^0$ is an alkyl group having 1 to 4 carbon atoms, and 0.1 to 3% of an acidic catalyst and heating the impregnated fabric at a temperature of about 110° to 200° C.

3. A process as defined in claim 2 in which the fabric is cotton.

4. A process as defined in claim 2 in which the fabric is rayon.

5. The process comprising impregnating a cellulose fabric with an aqueous solution containing 2 to 25% by weight of a compound of the formula

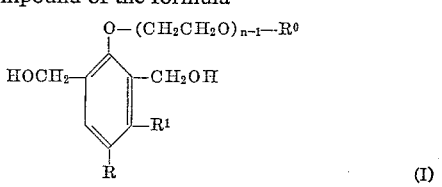

wherein $n$ is an integer having a value of 1 to 4,
R is selected from the group consisting of —H, —CH$_3$, —OCH$_3$, and —CH$_2$OH,
R$^1$ is selected from the group consisting of —H and —CH$_3$,
R$^0$ is an alkyl group having 1 to 4 carbon atoms, and 0.1 to 3% of zinc perchlorate as a catalyst, and heating the impregnated fabric at a temperature of about 110° to 200° C.

6. A process according to claim 5 in which the fabric is cotton.

7. A process according to claim 5 in which the fabric is rayon.

8. The process comprising impregnating a cellulose fabric with an aqueous solution containing 2 to 25% by weight of 2,6-dihydroxymethyl-4-methylphenyl methyl ether and 0.1 to 3% by weight of an acidic catalyst, and heating the impregnated fabric at a temperature of about 110° C. to 200° C.

9. The process comprising impregnating a cellulose fabric with an aqueous solution containing 2 to 25% by weight of 2-(methoxyethoxyethoxy)-5-methyl - α,α' - dihydroxy-m-xylene and 0.1 to 3% by weight of an acidic catalyst, and heating the impregnated fabric at a temperature of about 110° C. to 200° C.

10. The process comprising impregnating a cellulose fabric with an aqueous solution containing 2 to 25% by weight of 2,5-dimethoxy - α,α' - dihydroxy-m-xylene and 0.1 to 3% by weight of an acidic catalyst, and heating the impregnated fabric at a temperature of about 110° C. to 200° C.

11. The process comprising impregnating a cellulose fabric with an aqueous solution containing 2 to 25% by weight of 2,4,6-tri(hydroxymethyl)-anisole and 0.1 to 3% by weight of an acidic catalyst, and heating the impregnated fabric at a temperature of about 110° C. to 200° C.

12. The process comprising impregnating a cellulose fabric with an aqueous solution containing 2 to 25% by weight of 2,4,6-tri(hydroxymethyl)-3-methyl-anisole and 0.1 to 3% by weight of an acidic catalyst, and heating the impregnated fabric at a temperature of about 110° C. to 200° C.

13. The process comprising impregnating a cellulose fabric with an aqueous solution containing 2 to 25% by weight of 2-(methoxyethoxyethoxy)-5-hydroxymethyl-$\alpha,\alpha'$-dihydroxy-m-xylene and 0.1 to 3% by weight of an acidic catalyst, and heating the impregnated fabric at a temperature of about 110° C. to 200° C.

14. A cellulose fabric having improved crease resistance obtained by the process of claim 1.

15. A cotton fabric having improved crease resistance obtained by the process of claim 3.

16. A regenerated cellulose fabric having improved crease resistance obtained by the process of claim 4.

References Cited in the file of this patent
UNITED STATES PATENTS

| | | |
|---|---|---|
| 2,196,256 | Dreyfus et al. | Apr. 9, 1940 |
| 2,224,293 | Finlayson et al. | Dec. 10, 1940 |
| 2,242,218 | Auer | May 20, 1941 |
| 2,311,027 | Burke et al. | Feb. 16, 1943 |

OTHER REFERENCES

Chemische Berichte, Ullmann and Brittner, col. 42, 2539 (1909).

Ser. No. 233,292, Schubert et al. (A.P.C.), published May 4, 1943.

Gagliardi et al.: Amer. Dyestuff Reporter, January 9, 1950.

Matlin et al.: Industrial & Engineering Chemistry, September 1955.

UNITED STATES PATENT OFFICE
CERTIFICATE OF CORRECTION

Patent No. 3,122,411            February 25, 1964

John L. Gardon et al.

It is hereby certified that error appears in the above numbered patent requiring correction and that the said Letters Patent should read as corrected below.

Column 5, lines 61 to 67, the formula should appear as shown below instead of as in the patent:

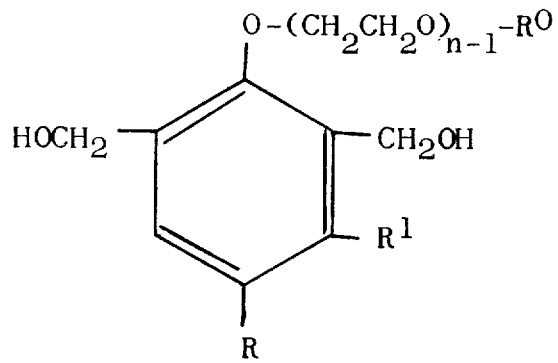

Signed and sealed this 30th day of June 1964.

(SEAL)
Attest:

ERNEST W. SWIDER            EDWARD J. BRENNER

Attesting Officer            Commissioner of Patents